(12) United States Patent
VanderMeer et al.

(10) Patent No.: US 11,511,987 B2
(45) Date of Patent: Nov. 29, 2022

(54) METHODS AND SYSTEMS FOR FUEL TRANSACTION PRODUCT DETECTION

(71) Applicant: WEX Inc., Portland, ME (US)

(72) Inventors: Daniel M. VanderMeer, Louisville, KY (US); Lanelle G. Duke, Falmouth, ME (US)

(73) Assignee: WEX Inc., Portland, ME (US)

( * ) Notice: Subject to any disclaimer, the term of this patent is extended or adjusted under 35 U.S.C. 154(b) by 108 days.

(21) Appl. No.: 17/151,743

(22) Filed: Jan. 19, 2021

(65) Prior Publication Data

US 2021/0139312 A1   May 13, 2021

Related U.S. Application Data

(63) Continuation of application No. 16/032,350, filed on Jul. 11, 2018, now abandoned.

(60) Provisional application No. 62/531,544, filed on Jul. 12, 2017.

(51) Int. Cl.
| | |
|---|---|
| *B67D 7/00* | (2010.01) |
| *G07F 13/00* | (2006.01) |
| *G07C 5/00* | (2006.01) |
| *G06N 20/00* | (2019.01) |
| *B67D 7/14* | (2010.01) |
| *G07F 13/02* | (2006.01) |
| *B67D 7/04* | (2010.01) |
| *G07C 5/08* | (2006.01) |

(52) U.S. Cl.
CPC ............. *B67D 7/145* (2013.01); *B67D 7/04* (2013.01); *G06N 20/00* (2019.01); *G07C 5/0841* (2013.01); *G07F 13/025* (2013.01)

(58) Field of Classification Search
CPC .......... B67D 7/145; B67D 7/04; G06N 20/00; G07C 5/0841; G07F 13/025; G06Q 10/00–50/00
USPC ................................................ 705/7.11–7.42
See application file for complete search history.

(56) References Cited

U.S. PATENT DOCUMENTS

| | | | |
|---|---|---|---|
| 2002/0065736 A1 | 5/2002 | Willner et al. | |
| 2008/0195432 A1* | 8/2008 | Fell ..................... | G06Q 30/0201 705/16 |
| 2008/0262892 A1* | 10/2008 | Prager ................. | G06Q 30/0268 705/41 |
| 2008/0306821 A1 | 12/2008 | Fell et al. | |
| 2010/0288834 A1 | 11/2010 | Tichelaer et al. | |
| 2014/0201065 A1 | 7/2014 | Cox et al. | |

(Continued)

OTHER PUBLICATIONS

Partially-redacted PowerPoint presentation that was disclosed to representatives of another company on Feb. 17, 2016.

(Continued)

*Primary Examiner* — Mustafa Iqbal
(74) *Attorney, Agent, or Firm* — Pierce Atwood LLP

(57) ABSTRACT

A computer implemented method comprises storing a transaction variable-set corresponding to a fuel transaction for a vehicle, wherein the transaction variable-set includes a fuel consumption history for the vehicle, a net sale, a number of purchased fuel units, and a diff value. The method further comprises deriving, by a machine learning module and based on the transaction variable-set, a plurality of characteristics of the purchased fuel, wherein the plurality of characteristics includes a fuel type of the purchased fuel and a fuel grade of the purchased fuel.

20 Claims, 17 Drawing Sheets

(56) References Cited

U.S. PATENT DOCUMENTS

2017/0236136 A1\* 8/2017 He ................... G06N 7/005
 705/7.31
2018/0285788 A1 10/2018 Andrei et al.

OTHER PUBLICATIONS

Partially-redacted PowerPoint presentation that was disclosed to representatives of another company on Mar. 9, 2016.

\* cited by examiner

METHODS AND SYSTEMS FOR FUEL TRANSACTION PRODUCT DETECTION

CROSS-REFERENCE TO RELATED APPLICATIONS

This application is continuation and claims the benefit under 35 U.S.C. § 120 of U.S. patent application Ser. No. 16/032,350, entitled METHODS AND SYSTEMS FOR FUEL TRANSACTION PRODUCT DETECTION, filed Jul. 11, 2018, which claims the benefit under 35 U.S.C. § 119(e) of U.S. Provisional Patent Application Ser. No. 62/531,544, filed Jul. 12, 2017, and entitled METHODS AND SYSTEMS FOR FUEL TRANSACTION PRODUCT DETECTION, the entire contents of each of which are incorporated herein by reference.

TECHNICAL FIELD

The present disclosure relates generally to systems and method for detecting product categories in a fuel transaction and in particular to detecting miscodings in such transactions.

BACKGROUND

Many companies use a fleet of vehicles for their operations. The vehicles may be driven by employees or contractors to transfer people or goods. Each driver may purchase fuel for the driver's vehicle using a fuel credit card, or a fleet card, assigned to the vehicle or to the driver. In some cases, a driver presents a fleet card at a vendor's fuel terminal, e.g., a card reader at a fuel pump, and selects a fuel type or grade. The fuel terminal may transfer to the company or to an intermediary the information about the selection or the fuel credit card. The intermediary may be, for example, a transaction processing center. The transaction processing center may approve the transaction to proceed by, for example, verifying the validity of the fleet card. Also, after a fuel purchase completes, the fuel terminal may transfer to the intermediary the information about the transaction. The information may include purchased fuel's type, grade, or amount, net sale amount, etc. The transaction processing center may use this information to analyze a group of transactions for the company's fleet and, for example, identify cost savings opportunities.

A significant portion of the company's operational cost may include the cost of the fleet's fuel. To reduce the fuel cost, the company may need the transaction processing center to analyze the fuel purchases of one or more drivers. The analysis may include identifying drivers that regularly purchase fuel of a higher grade than required, and thus more expensive than needed.

Such an analysis requires accurate data about the transactions. The transaction data, however, may include errors that prevent accurate analyses. In some cases, different fuel types or grades may be identified by different numerical codes. A fuel vendor's fuel terminals may regularly transfer a wrong code for a fuel type or grade. Such a miscoding may introduce errors in the analysis. What are needed are systems and methods to identify such miscodings and correct them.

BRIEF DESCRIPTION OF THE DRAWINGS

The drawings are not necessarily to scale or exhaustive. Instead, emphasis is generally placed upon illustrating the principles of the embodiments described herein. The accompanying drawings, which are incorporated in this specification and constitute a part of it, illustrate several embodiments consistent with the disclosure. Together with the description, the drawings serve to explain the principles of the disclosure.

In the drawings.

DETAILED DESCRIPTION

Figure 1:
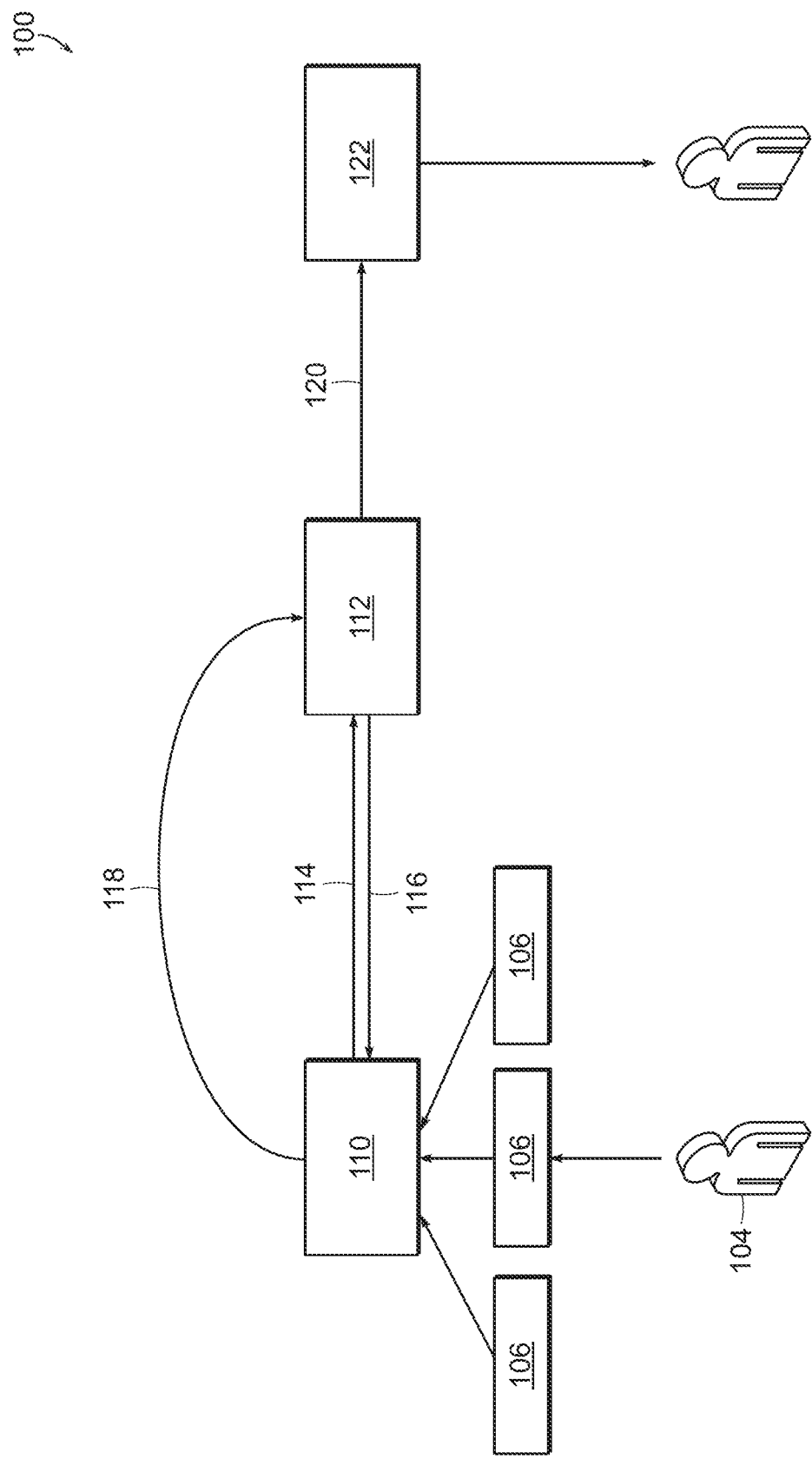
FIG. 1 shows a diagram for a transaction processing and analyzing system according to some embodiments.

The following detailed description refers to the accompanying drawings. The same or similar reference numbers may be used in the drawings or in the description to refer to the same or similar parts. Also, similarly named elements may perform similar functions and may be similarly designed, unless specified otherwise. Details are set forth to provide an understanding of the exemplary embodiments. Embodiments, e.g., alternative embodiments, may be practiced without some of these details. In other instances, well known techniques, procedures, and components have not been described in detail to avoid obscuring the described embodiments.

Some embodiments provide systems and methods for transferring and analyzing transaction data. Moreover, some embodiments provide systems and methods for identifying and correcting miscodings. Existing systems, such as computer systems, are not capable of analyzing such data or addressing miscodings. Various embodiments enable computer systems to perform such analyses.

FIG. 1 shows a diagram for a fuel transaction processing and analyzing system 100 according to some such embodiments. The system includes one or more fuel vendors 106, a merchant network 110, a transaction processing center 112, and a machine learning module 122.

A purchaser 104 purchases fuel at a fuel vendor 106. Purchaser 104 may be a driver of a vehicle of a fleet of vehicles owned by a company. Fuel vendor 106 may include one or more fuel terminals each connected to a fuel pump with which the purchaser interacts to purchase fuel. Fuel vendor 106 may be a merchant at a fuel station affiliated with a fuel station franchise or an oil company. In some embodiments, the purchaser presents a fuel credit card at the fuel terminal for processing the purchase. The fuel credit card may provide information that identifies the purchaser, the vehicle, or a credit account, etc.

One or more fuel vendors 106 may exchange electronic messages with transaction processing center 112 through merchant network 110. Merchant network 110 may be a wired or a wireless communication network, or a combination of them. The merchant network may connect one or more fuel vendors 106 affiliated with the same franchise. Transaction processing center 112 may include one or more computer processors for exchanging and processing messages and data.

Vendor 106 may send an authorization request 114 to transaction processing center 112 to allow the transaction to proceed. The authorization request may include some information about the transaction, such as information identifying one or more of the vehicle, the purchaser, the fuel credit card, and the fuel vendor; or quantifying the transaction by including the net sale. Transaction processing center 112 may authorize the transaction by, for example, verifying that the credit account associated with the transaction is valid or that it contains enough credit for the net sale.

If transaction processing center 112 authorizes the purchase, it may return an authorization message 116 to vendor 106 that requested authorization. Vendor 106 may then allow the transaction to proceed.

Vendor 106 may further send transaction data 118 to transaction processing center 112. The transaction data may include information identifying one or more of the vehicle, the purchaser, and the fuel vendor; or quantifying the transaction by including one or more of the net sale, the total units sold, the unit price, etc. The transaction data may further include information identifying the fuel type-grade. The fuel type-grade may be identified, for example, by a product code. Transaction data 118 may be sent individually after each transaction, or gathered and sent in batches, for example once a day. Moreover, transaction data 118 may be sent to transaction processing center 112 by an information gathering center that collects the data from one or more vendors and sends them in one or more batches.

Transaction processing center 112 may transmit one or more transaction data 120 to machine learning module 122, which is trained to detect errors in the transaction data. In particular, as detailed below, machine learning module 122 may be trained to detect errors in the product code, which identifies the fuel type-grade. As further detailed below, upon such detection, transaction processing center 112 may correct those errors and store the transaction data with the correct code. Transaction processing center 112 may further analyze the transaction data, based on the correct codes and provide the analysis to a fleet manager. The analysis may include, for example and as detailed below, a summary of fuel purchase habits of one or more purchasers and identifying savings opportunities.

As detailed below, and in some embodiments, the machine learning module classifies fuel transactions into different categories. A machine learning module may in general classify objects into different categories based on one or more variables that identify some characteristics of each object. In one example, the objects may be flowers, the categories may be different species of the flower, and the variables may be sizes of one or more parts of the flower, e.g., its petal or stem. In another example, the objects may be historical buildings, the categories may be different architectural styles (e.g., Roman, Gothic, Renaissance, etc.), and the variables may include the building materials, building size, building parts, types of structures (e.g., domes, arches, columns, tiles, etc.). In yet another example, relevant to this disclosure, the objects may be fuel purchase transactions, the categories may be the fuel's characteristics (e.g., fuel type and fuel grade), and the variables may include one or more information in the transaction, such as the number of units, the net sale, the unit price, or information related to purchase history of the vehicle. The transaction may thus be labeled by the fuel's type and grade (together called type-grade).

Figure 2:
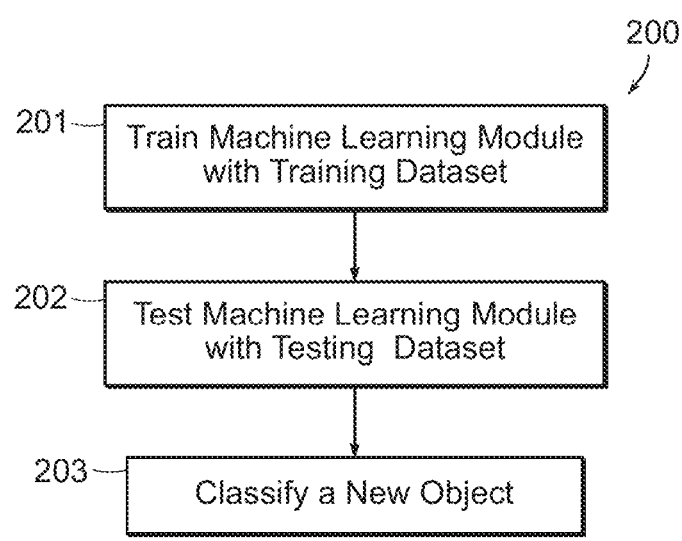
FIG. 2 shows a flowchart for training, testing, and applying a machine learning module according to some embodiments.
Figure 3:
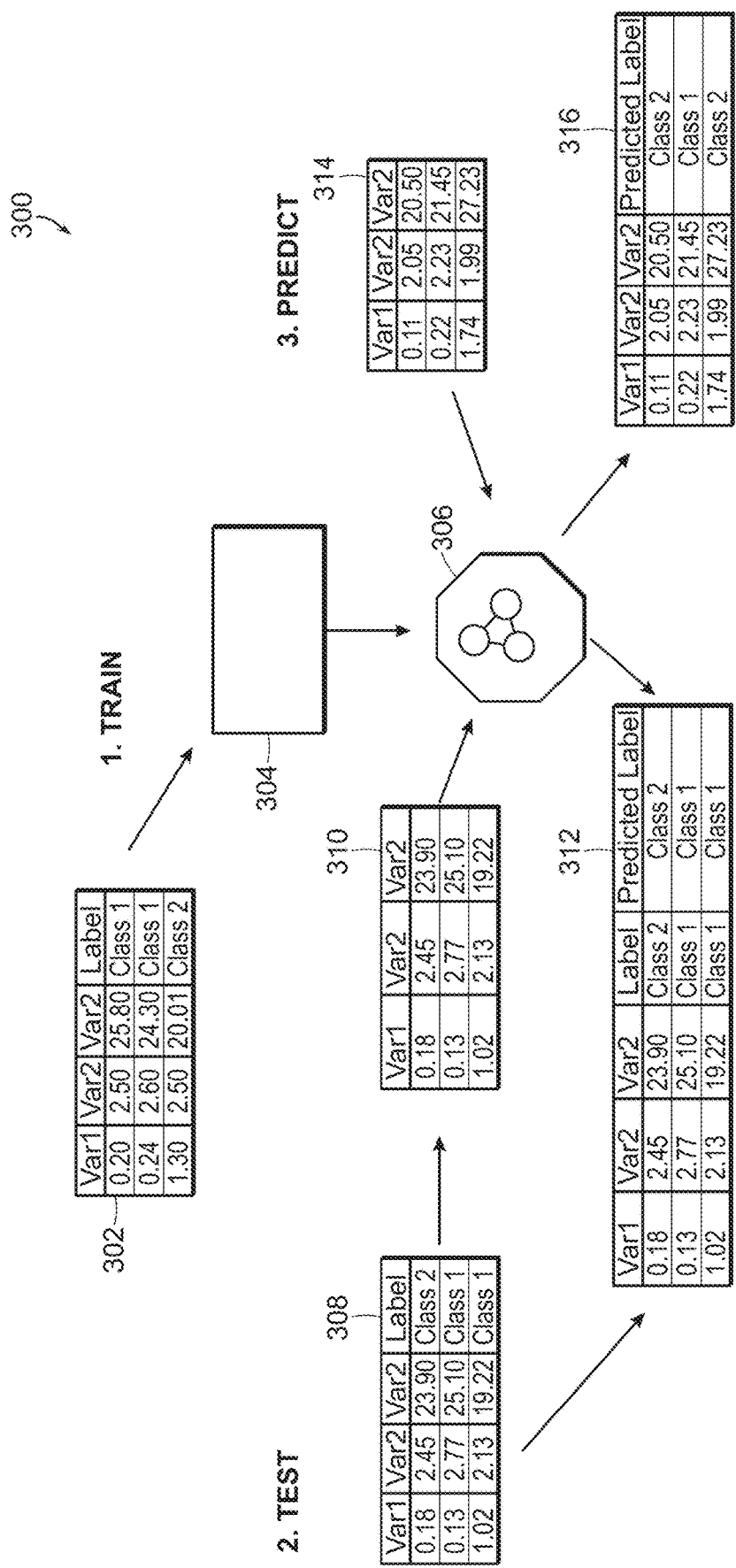
FIG. 3 shows a diagram of datasets used in the training and testing, and a dataset to which the machine learning module is applied for classification according to an embodiment.

For the machine learning module to perform a classification, the machine learning module may be trained and tested with data from a plurality of transactions with known labels. FIG. 2 shows a flowchart 200 for training, testing, and applying a machine learning module according to some embodiments. FIG. 3, on the other hand, shows a diagram 300 of datasets used in the training and testing, and a dataset to which the machine learning module is applied for classification.

In step 201, the machine learning module is trained with a training dataset. A training dataset corresponds to a set of objects with known categories, called training objects. In particular, the training dataset includes values of the variables and the category (or label) for each training object.

In diagram 300, table 302 shows an exemplary training dataset. Table 302 has three rows and four columns. Each row corresponds to a training object. The first three columns correspond to three variables used for training the machine learning module, named Var1, Var2, and Var3. The fourth column, on the other hand, corresponds to the known category of each training object. The values and labels are generic and for illustration.

In table 302, the values of the first three columns in the first row, for example, show that for the first training object, the values of Var1, Var2, and Var3 are respectively 0.20, 2.50, and 2.80. The value of the fourth column in the first row, on the other hand, shows that the first training object has a label class 1 and thus belongs to the category class 1. Similarly, the values in the second row show that for the second training object, the values of Var1, Var2, and Var3 are respectively 0.24, 2.60, and 24.30; and the category is class 1. And the values in the third row show that for the third training object, the values of Var1, Var2, and Var3 are respectively 1.30, 2.50, and 20.01; and the category is class 2.

Diagram 300 shows that the training dataset of table 302 is passed to a machine learning module 304. Machine learning module 304 uses the training dataset to create a model 306 for classifying the dataset.

Returning to FIG. 2, in step 202 the already trained machine learning module is tested with a testing dataset. A testing dataset corresponds to a set of objects with known categories, called testing objects. In particular, the testing dataset includes values of the variables and the category for each testing object.

In general the testing dataset may be different from the training dataset. In some embodiments, a set of objects with known variables and categories is divided into a first subset used as training objects and a second subset used as a testing objects.

In diagram 300 of FIG. 3, table 308 shows an exemplary testing dataset. Table 308 has three rows and four columns. Each row corresponds to a testing object. The columns are similar to those of table 302. The values and labels are generic and for illustration.

In table 308, the values in the first row show that for the first testing object, the values of Var1, Var2, and Var3 are respectively 0.18, 2.45, and 23.90; and the category is class 2. The values in the second row show that for the second testing object, the values of Var1, Var2, and Var3 are respectively 0.13, 2.77, and 25.10; and the category is class 1. And the values in the third row show that for the third testing object, the values of Var1, Var2, and Var3 are respectively 1.02, 2.13, and 19.22; and the category is class 1.

Returning to FIG. 2, in testing step 202 the machine learning module receives the variables for each testing object and, based on the variables, predicts the category of the testing object.

In diagram 300 of FIG. 3, table 310 includes the data of the variables for the testing objects, that is, the first three columns of the testing dataset table 308. These data are fed to model 306 of the machine learning module, which predicts the categories of each testing object. Table 312 includes all data of testing dataset table 308 plus a fifth column that shows the predicted category for each testing object.

In testing step 202, the system then compares the predicted category of the testing object with its known category and flags the prediction as a pass or fail if the two are the same or different, respectively. The system performs this testing for all testing objects. The system then calculates the total pass rate (number of passes divided by total number of testing objects). The system then flags the training a success and the machine learning module ready for use if the success rate exceeds a success rate threshold. If the success rate is below the success rate threshold, the training step 201 may be repeated with a new training dataset or by choosing a new combination of variables. Then testing step 202 is repeated to calculate a new success rate. Steps 201 and 202 may thus be repeated until the success rate reaches or exceeds the success rate threshold. In various embodiments, the success rate threshold may be 80%, 90%, 95%, 99%, etc.

In step 203, the system uses the machine learning module to classify one or more new objects. The new object may be an object for which the variables are known but the category is not known. The machine learning module receives the variables for the new object and, based on those variables, predicts the category of the new object.

In diagram 300 of FIG. 3, table 314 shows an exemplary dataset for three new objects with unknown categories. Table 314 has three rows and three columns. Each row corresponds to one new object. The three columns are similar to the first three columns of table 302. The values are generic and for illustration.

In table 314, the values in the first row show that for the first new object, the values of Var1, Var2, and Var3 are respectively 0.11, 2.05, and 20.50; the values in the second row show that for the second new object, the values of Var1, Var2, and Var3 are respectively 0.22, 2.23, and 21.45; and the values in the third row show that for the third new object, the values of Var1, Var2, and Var3 are respectively 1.74, 1.99, and 27.23.

These data for each new object from table 314 are fed to model 306 of the machine learning module, which predicts the categories of the new object. Table 316 includes all data of new objects dataset table 316 plus a fourth column that shows the predicted category for each new object.

In some embodiments, the above mechanism of machine learning is used to identify categories of a purchased fuel based on one or more variables in the transaction. FIGS. 4A-4D illustrate some patterns in different variables of a fuel transaction in relation to the fuel's category. More specifically, FIGS. 4A-4D show four transaction variable datasets of four different categories of fuel according to some embodiments. Each dataset depicts a set of variable data corresponding to transactions that include the purchase of fuel of a specific type and grade (type-grade). Different categories may differ by the fuel type, fuel grade, or both. A transaction is distinguished by the purchaser's vehicle and the time of the transaction. Another property of a transaction, though not necessarily independent, is the location of the transaction, which can be identified by an identification of the fuel station or the geographic coordinates of the location.

Figure 4A:
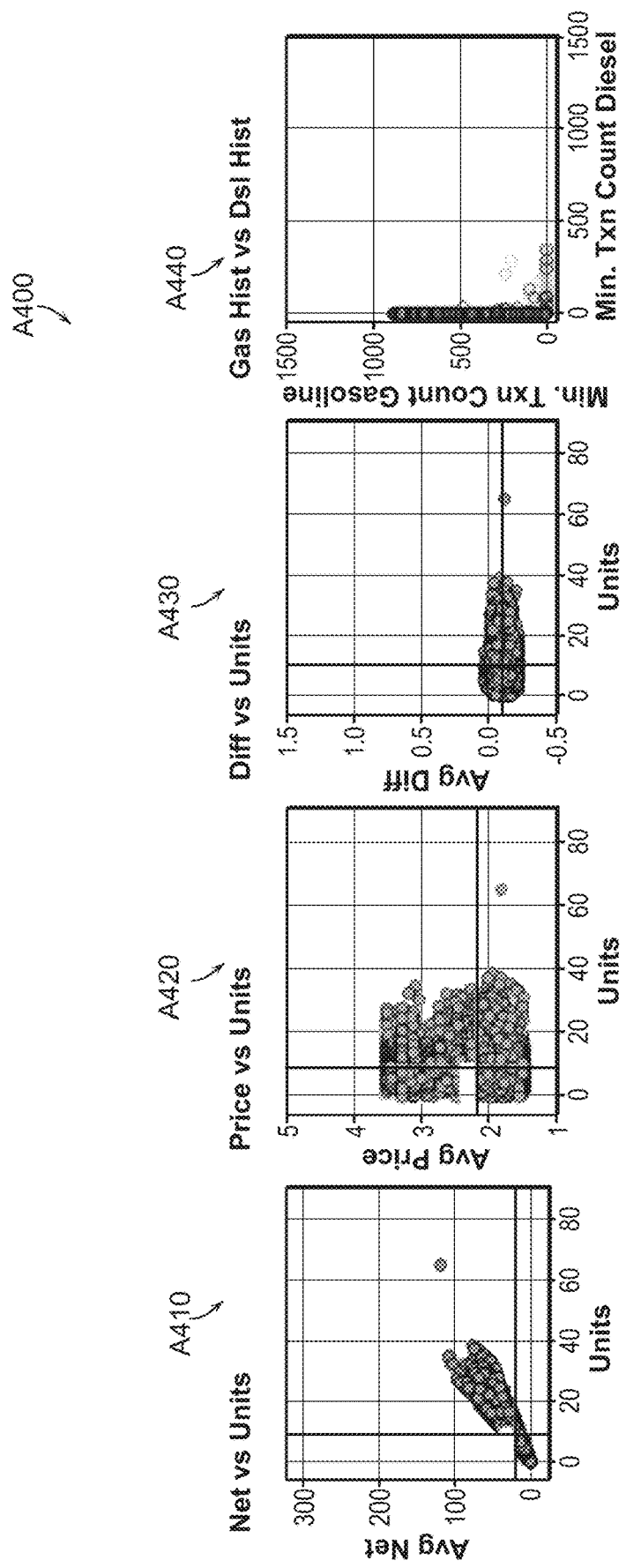
FIGS. 4A-4D illustrate four datasets of four different categories of fuel according to some embodiments.
Figure 4B:
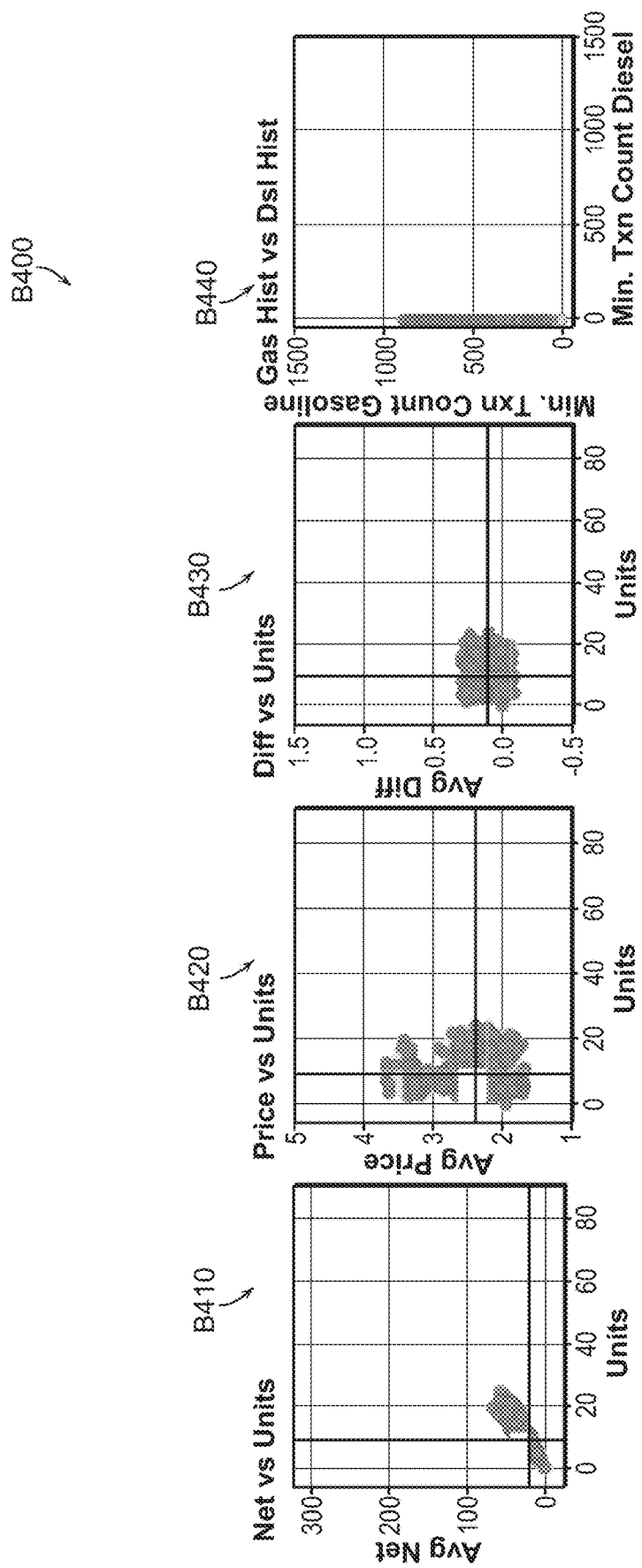
Figure 4C:
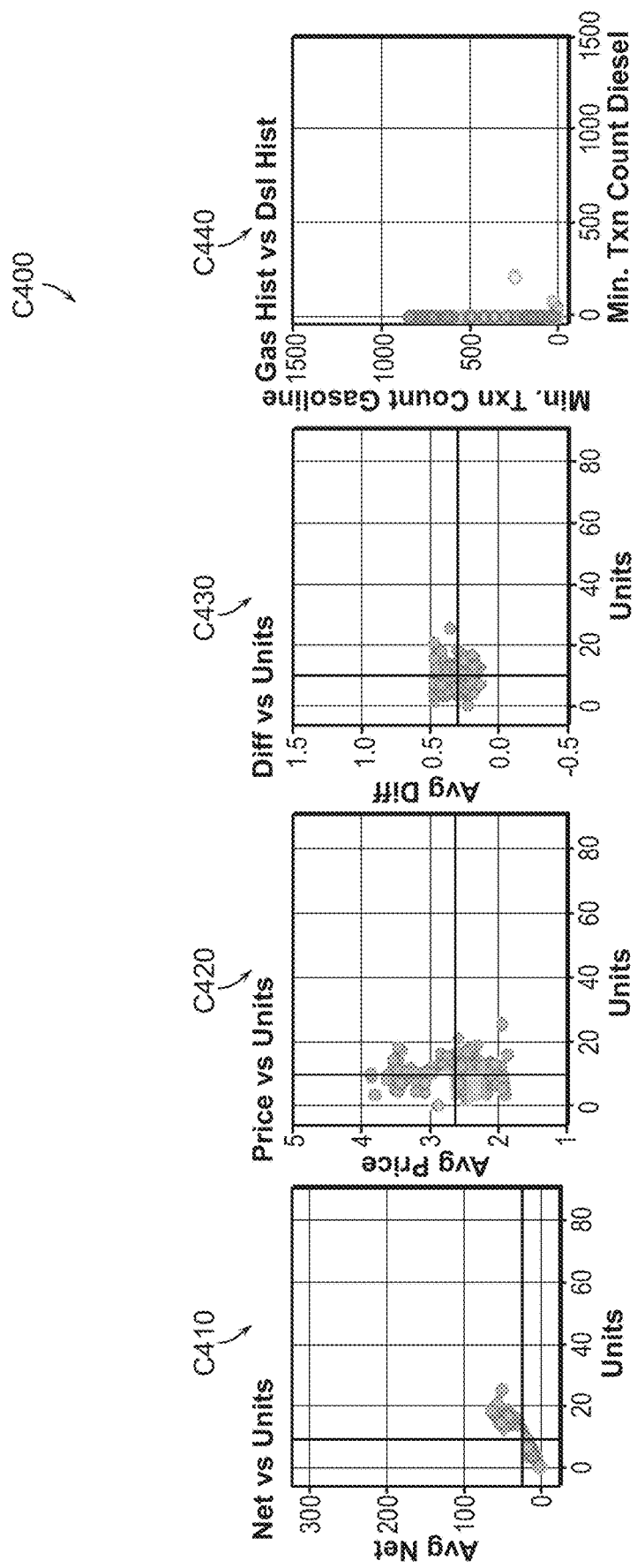
Figure 4D:
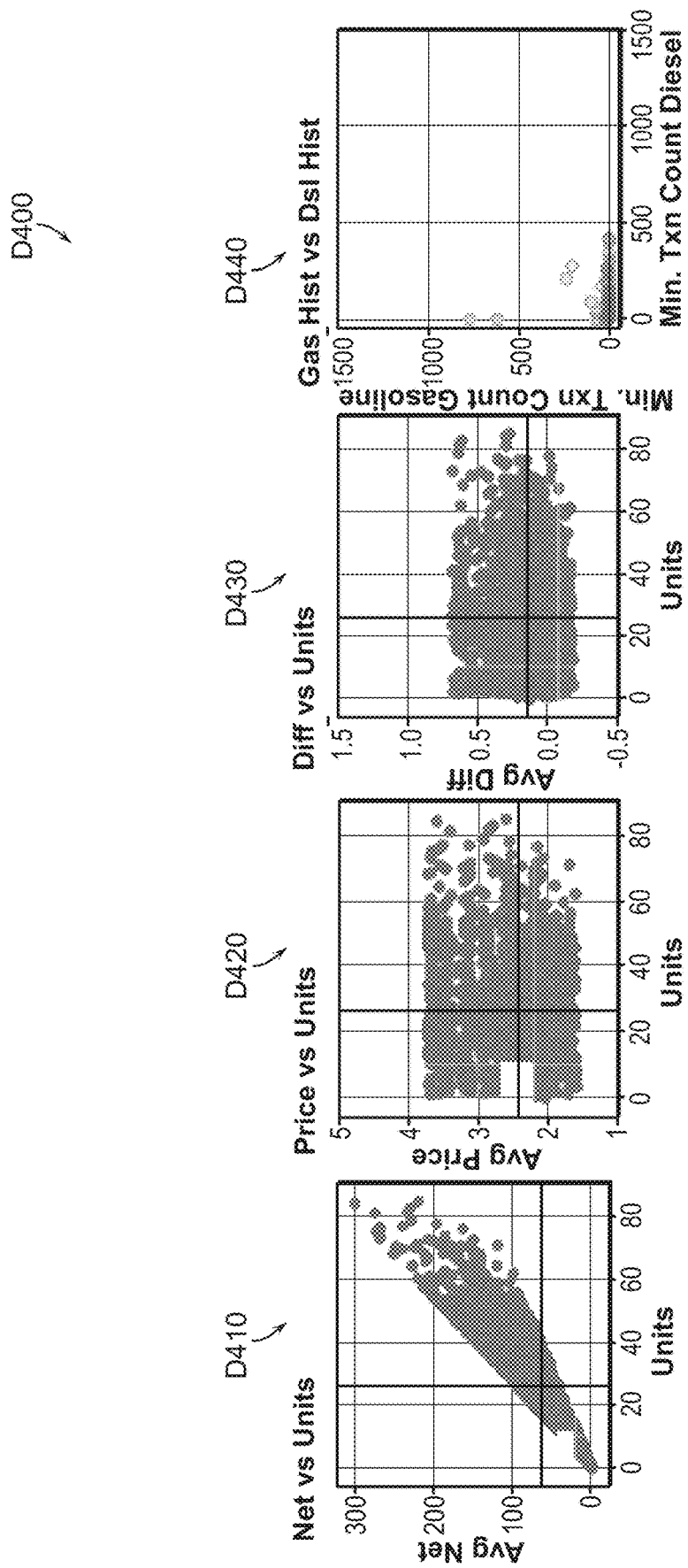

More particularly, FIGS. 4A-4C illustrate three datasets for purchases of the same fuel type, gasoline, but of different fuel grades: regular, super, and premium, respectively. FIG. 4D, on the other hand, illustrates a dataset for purchases of fuel type diesel and fuel grade regular. Each figure illustrates the data in four frames 410, 420, 430, and 440. FIG. 4X, for example, includes frames X410, X420, X430, and X440, where X can be A, B, C, or D.

Each frame is in the form of a scatter plot for the transactions. Each transaction in the dataset is represented by one dot in each of the four frames. The multiple dots in each frame, therefore, represent the multiple transactions of the same fuel type-grade in the dataset. Two transactions in two different datasets, i.e., two different figures, differ by the fuel type, fuel grade, or both. Two different transactions within the same dataset differ by their vehicle, time, or both.

For each transaction, a dataset includes a set of variables called a variable-set for that transaction. A variable-set is a set of variables that quantify some details of the transaction or summarize some past transactions by the vehicle associated with the transaction. The variable-set shown in the four frames of each FIG. 4X, for example, includes six variables for each transaction: the number of units of sold merchandise, the net sale, the unit price, a diff value, and the number of past purchases of each fuel type (here gasoline and diesel) by the same vehicle. These variables are further detailed below. Each frame shows a scatter plot of each transaction based on the values of a pair of these six variables. These setups are for illustration and do not indicate that the machine learning module necessarily receives the variables, or a subset of those variables, in pairs, or that a member of a pair is necessarily a function of the other member of the pair.

In FIG. 4X, the frames illustrate the following variables for the transactions in the corresponding dataset. In frame X410, the x and y coordinates of each dot respectively show the values of the number of units purchased and the net sale in the transaction represented by the dot. For fuel, the unit may be a unit of volume such as gallon (as in FIGS. 4A-4D) or liter. The net sale may be the total payment measured in a currency such as dollar (as in FIGS. 4A-4D).

In frame X420, the x and y coordinates of each dot respectively show the values of the number of units purchased and the unit price in the transaction represented by the dot. The unit price may be measured in a currency such as dollar (as in FIGS. 4A-4D) and derived by dividing the net sale by the number of units.

In frame X430, the x and y coordinates of each dot respectively show the values of the number of units purchased and a diff value for the transaction. The diff value may be a difference between the unit price in the transaction and a fuel price index. The fuel price index may be an average unit price of the fuel of the lowest grade of the same type as the fuel in the transaction, in a region that includes the location of the transaction and in a time window that includes the time of the transaction.

In some embodiments, a fuel price index is calculated for each transaction. More specifically, the fuel price index for a transaction is calculated by averaging fuel prices from fuel transactions that involved fuel of the lowest grade of the same type, which occurred at other fuel merchants within close geographic proximity of the fuel transaction and within the same time frame. The close geographic proximity may be defined as a region within a specific distance from the location of the merchant. The specific distance may be, for example, one mile, five miles, or ten miles, etc. The time frame may be within a specific time difference from the time of the transaction, for example, one hour, five hours, one day, one week, etc. In some embodiments, if the purchased fuel is of any grade of type gasoline, the fuel price index is a gasoline price index, which is an average fuel price for fuel type gasoline of lowest (e.g., regular) grade in transactions that occurred at other fuel merchants within close geographic proximity of the fuel transaction and within the same time frame. Alternatively, if the purchased fuel is of any grade of type diesel, the fuel price index is a diesel price index, which is an average fuel price for fuel type diesel of lowest (e.g., regular) grade in transactions that occurred at other fuel merchants within close geographic proximity of the fuel transaction and within the same time frame.

The diff value may indicate the relation between the transaction price and the price of the lowest grade fuel in the related market. These variables may be measured in a currency such as dollar (as in FIGS. 4A-4D).

In frame X440, the x and y coordinates of each dot show the fuel type consumption history for the two types, that is, the number of past transactions in which the purchased fuel for the same vehicle as the one in the transaction was diesel and gasoline, respectively. The system may track those transactions for each vehicle for a period of time. The period of time may be past month, past six months, past year, past two years, etc.

Next, datasets in FIGS. 4A-4D are compared for the embodiments illustrated in these figures to illustrate some patterns. The machine learning module may or may not use these patterns for creating a model used in the classification.

The distribution of the x coordinates of the data in frames X410, X420, or X430 may indicate some characteristics of the purchased merchandise. A merchandise such as candies, for example, shows a discrete distribution of units, while for fuels the distribution is continuous. Further, the range of the x coordinates in these frames show the range of the number of units in each dataset. When the merchandise is a fuel, these ranges may indicate the capacity of the fuel tank in the vehicles that use the corresponding fuel type-grade. FIG. 4A for example, shows that vehicles that use gasoline of grade regular have fuel tanks with maximum capacities of around 40 gallons, while FIGS. 4B and 4C show that vehicles that use gasoline of higher grades (super and premium) have fuel tanks with maximum capacities of around 30 gallons or less. FIG. 4D, on the other hand, shows that vehicles that use diesel of grade regular have fuel tanks with maximum capacities of around 80 gallons.

The values of the price in frame X420 may indicate the range of prices for the corresponding fuel type-grade for different transactions, completed at different times or fuel stations. These data show that, in the illustrated embodiments, the price for each type-grade may change between around $1.5 and $3.5.

The values of diff in frames X430, on the other hand, may differentiate among different fuel type-grades. These values illustrate the relation between the price of the corresponding fuel type-grade with the fuel price index, which takes into account the time and location of the transaction, and the fuel type. Frame A430, for example, shows that for the transactions of fuel type-grade gasoline-regular, the diff values are between around −0.2 to around 0.1, with an average diff around −0.1 (indicated by the thick horizontal line). Further, frame B430 shows that for the transactions of fuel type-grade gasoline-super, the diff values are between around −0.1 to around 0.25, with an average diff around 0.1; frame C430 shows that for the transactions of fuel type-grade gasoline-premium, the diff values are between around 0.1 to around 0.5, with an average diff around 0.3; and frame D430 shows that for the transactions of fuel type-grade diesel-regular, the diff values are between around −0.2 to around 0.75, with an average diff around 0.2.

The fuel type consumption history in frames X440 may further differentiate among different fuel types. Frames A440, B440, and C440, for example, show that for a large majority of transactions of fuel type gasoline, the past transactions by the same vehicle were also of the type gasoline, either entirely (dots on they axis) or with a big majority (dots near they axis). The few remaining dots indicate mix fuel type purchases. Some of the remaining few dots are on the x axis, indicating a vehicle that previously purchased fuel type diesel exclusively, and purchased fuel type gasoline only in the transaction recorded in the other frames in the corresponding figure. Some other dots are near the first quadrant bisector, indicating a vehicle that purchased both types of fuels in a comparable number of times. These mixed fuel type purchases may correspond to a vehicle that, for example, its driver purchases fuel not to fill the vehicle's fuel tank but to fill a separate container in the vehicle for a different use (e.g., to fuel a lawn mower).

Similarly, frame D440 shows that for a large majority of transactions of fuel type diesel, the past transactions by the same vehicle were also of the type diesel, either entirely (dots on the x axis) or with a big majority (dots near the x axis). The few remaining dots indicate mix fuel type purchases, similar to those explained above.

When the fuel type is known, some embodiments use a fuel grade consumption history to differentiate among different fuel grades in a similar manner. Such a history may be the number of past transactions in which the purchased fuel for the same vehicle as the one in the transaction was of a specific grade.

Figure 5:
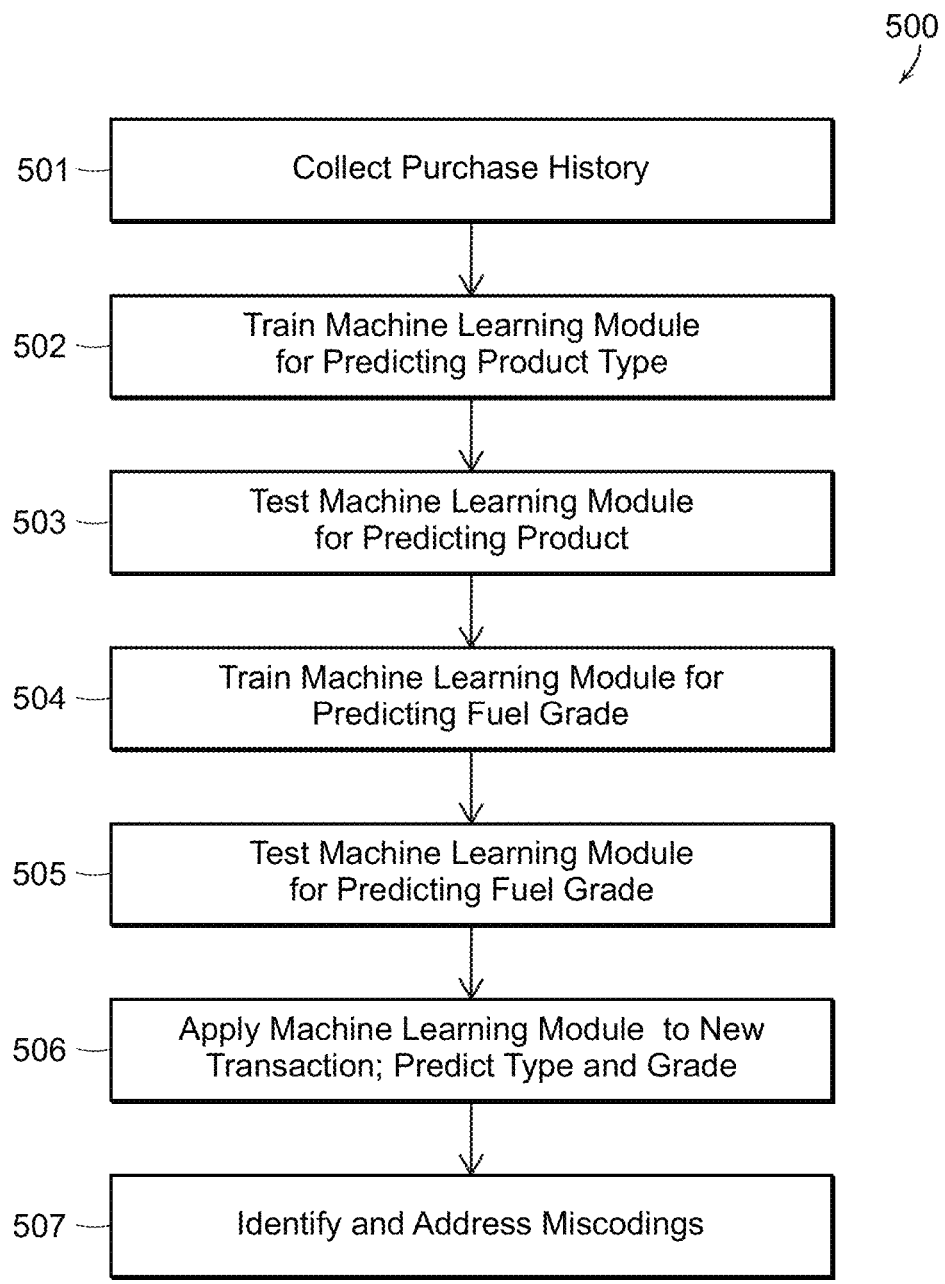
FIG. 5 shows a flowchart for a method of using machine learning for detecting characteristics of a fuel in a transaction according to some embodiments.

The above-discussed fuel transaction variables may be used to train, test, and use the machine learning module for detecting the purchased fuel's category. FIG. 5 shows a flowchart 500 for a method of training, testing, and using machine learning for detecting the category of a purchased fuel according to some embodiments. In particular, flowchart 500 includes steps 501-505 for training and testing the machine learning module using a sample dataset. A sample dataset may include a plurality of sample variable-sets, each corresponding to a transaction for which the fuel category is known. Flowchart 500 further includes steps 506-507 for detecting an unverified fuel category in a new transaction and addressing possible errors. Flowchart 500 may be executed by the fuel transaction processing and analyzing system or some parts of such system, such as the transaction processing center.

In step 501, the system collects the purchase history for a plurality of vehicles that are covered by the system. The purchase history may include the number of transactions for the vehicle in which fuel of each type-grade is purchased.

For steps 502-505, the system uses a sample dataset for multiple transactions for which the fuel type and grade is known. In one embodiment, the sample dataset includes variable-sets for a large number of transactions (e.g., around half a million or around one million transactions, etc.) that consist of purchases of all fuel types and grades covered by the system. The sample dataset may be divided into two separate datasets, a training dataset and a testing dataset. In different embodiments, these two datasets may consist of portions of the variable-sets in the sample dataset, e.g., 50% and 50%, or 80% and 20%, etc.

In step 502, the system trains the machine learning module for predicting the fuel type in a transaction. To that end, the system feeds the machine learning module with a plurality of training variable-sets in the training dataset and, for each training variable-set, the corresponding fuel type. The plurality of variable-sets may include variable-sets for different transactions of fuels of different types. In some embodiments, for executing step 502, the system uses a subset of the variables in the variable-set. The subset may include the number of units, the net sale, the unit price, and the number of past purchases of each fuel type by the same vehicle. The system further uses the known fuel type for the transaction associated for each variable-set. The training creates a trained product-type model that enables the machine learning module to predict the fuel type of a transaction from the variable-set for the transaction.

In step 503, the system tests the machine learning module for predicting the fuel type in a transaction. To that end, the system feeds the machine learning module with a plurality of testing variable-sets in the testing dataset and, for each variable-set, the corresponding fuel type. The plurality of variable-sets may include variable-sets for different transactions of fuels of different types. In some embodiments, for executing step 503, the system uses a subset of the variables in the variable-set. The subset may include the number of units, the net sale, the unit price, and the number of past purchases of each fuel type by the same vehicle. Based on these data, the machine learning module predicts the fuel type for each testing variable-set and compares the predicted fuel type with the known fuel type corresponding to that testing variable-set.

The system marks the training of step 502 as complete if the success rate (percent of cases in which the predicted fuel type matches the known fuel type) exceeds a fuel type success rate threshold. If the success rate is below the fuel type success rate threshold, the training step 502 may be repeated with a new training dataset or by choosing a new subset of variables in the variable-set. Then testing step 503 is repeated to calculate a new success rate. In various embodiments, the fuel type success rate threshold may be 95%, 99%, etc.

In step 504, the system trains the machine learning module for predicting the fuel grade in a transaction. To that end, the system feeds the machine learning module with a plurality of training variable-sets of the same fuel type (e.g., either gasoline or diesel) and, for each variable-set, the corresponding fuel grade. The plurality of training variable-sets may include variable-sets for different transactions of fuels of different grades. In some embodiments, for executing step 504, the system uses a subset of the variables in the variable-set. The subset may include the diff in price, the number of units, the net sale, and the number of past purchases of each fuel grade of that fuel type by the same vehicle. The system further uses the known fuel grade for the transaction associated for each variable-set. The training creates a trained product-type-class model for each product type, e.g., a product-gasoline-class model and a product-diesel-class model. Each product-type-class model enables the machine learning module to predict the fuel grade of a transaction of the corresponding fuel type from the variable-set for the transaction.

In step 505, the system tests the machine learning module for predicting the fuel grade in a transaction. To that end, the system feeds the machine learning module with a plurality of testing variable-sets of the same fuel type (e.g., either gasoline or diesel) and, for each testing variable-set, the corresponding fuel grade. The plurality of testing variable-sets may include variable-sets for different transactions of fuels of different grades. In some embodiments, for executing step 505, the system uses a subset of the variables in the testing variable-set. The subset may include the diff in price, the number of units, the net sale, and the number of past purchases of each fuel grade of that fuel type by the same vehicle. Based on these data, the machine learning module predicts the fuel grade for each testing variable-set and compares the predicted fuel grade with the known fuel grade corresponding to that testing variable-set.

The system marks the training of step 504 as complete if the success rate (percent of cases in which the predicted fuel grade matches the known fuel grade) exceeds a fuel grade success rate threshold. If the success rate is below the fuel grade success rate threshold, the training step 504 may be repeated with a new training dataset or by choosing a new subset of variables in the variable-set. Then testing step 505 is repeated to calculate a new success rate. In various embodiments, the fuel grade success rate threshold may be 95%, 99%, etc.

In step 506, the system applies the machine learning module to predict the characteristics of a new transaction that the system has not seen before. To that end, the machine learning module may receive a variable-set for the new transaction. The variable-set may include a fuel type consumption history for a vehicle associated with the new transaction, fuel grade consumption history for the vehicle, a net sale, a number of units, and a diff value for the new transaction. The diff value may be a difference between the unit price of the fuel and a unit price in a fuel price index. The system may calculate the fuel price index for each new transaction after it predicts the fuel type for the new transaction. The system may select the fuel price index for a geographical region that includes the location of the new transaction, and for a time window that includes the time of the new transaction.

Using the variable-set, the machine learning module derives one or more characteristics of the fuel purchased in the new transaction. In particular, the machine learning module may derive the type and the grade of the fuel.

In some embodiments, the system performs step 506 in two stages. During the first stage, the system derives the fuel type for the new transaction. To that end, the system feeds into the product-type model a first subset of the variable-set. The first subset may include a fuel type consumption history for the vehicle, the net sale, and the number of units. The product-type model derives the fuel type of the fuel based on the first subset.

During the second stage, the system derives the fuel grade for the new transaction. To that end, the system uses on the fuel type derived during the first stage, and calculates the fuel price index for the new transaction and also selects the product-type-class model. That is, for example, if the derived fuel type is gasoline, the system calculates a gasoline price index and also selects the product-gasoline-class model. If, on the other hand, the derived type is diesel, the system calculates a diesel price index and also selects the product-diesel-class model. The system calculates the diff value using the calculated fuel price index. The system then feeds into the selected product-type-class model a second subset of the variable-set. The second subset may include the diff value, a fuel grade consumption history for the vehicle, the net sale, and the number of units. The product-type-class model derives the fuel grade of the fuel based on the second subset.

In step 507, the system uses the predicted characteristics to derive the product code for the fuel. Product codes may be numerical values that are mapped to identify the fuel type-grade. The system then compares the derived code with the code that it receives as part of the new transaction data. If the two codes do not match, the system may mark the new transaction as miscoded. The system may further address the miscoding by changing the code in the new transaction data to the derived code.

FIGS. 6A-6D illustrate a dataset for transactions that have been miscoded before and after the miscoding is corrected by the system according to an embodiment. In particular, FIG. 6A includes frames A610, A620, A630, and A640 for a dataset A600 in which in all transactions the purchased item is coded as a general merchandise and not fuel.

The variable-sets in dataset A600 are fed into a machine learning module that has been trained as detailed above. The machine learning module determines that the purchased product in each transaction is a fuel of either type-grade gasoline-regular or type-grade diesel-regular.

Figure 6A:
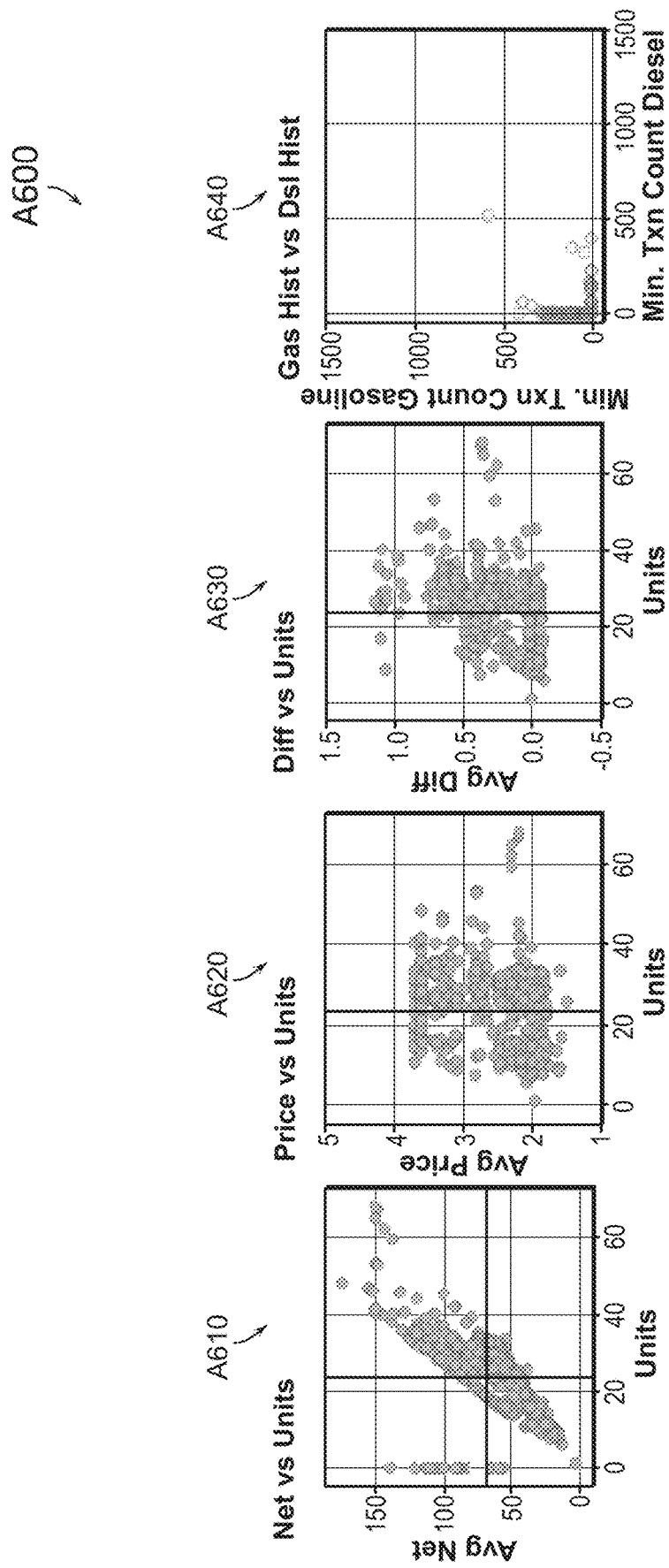
FIGS. 6A-6D illustrate a dataset for transactions that have been miscoded before and after the miscoding is corrected by the system according to an embodiment.
Figure 6B:
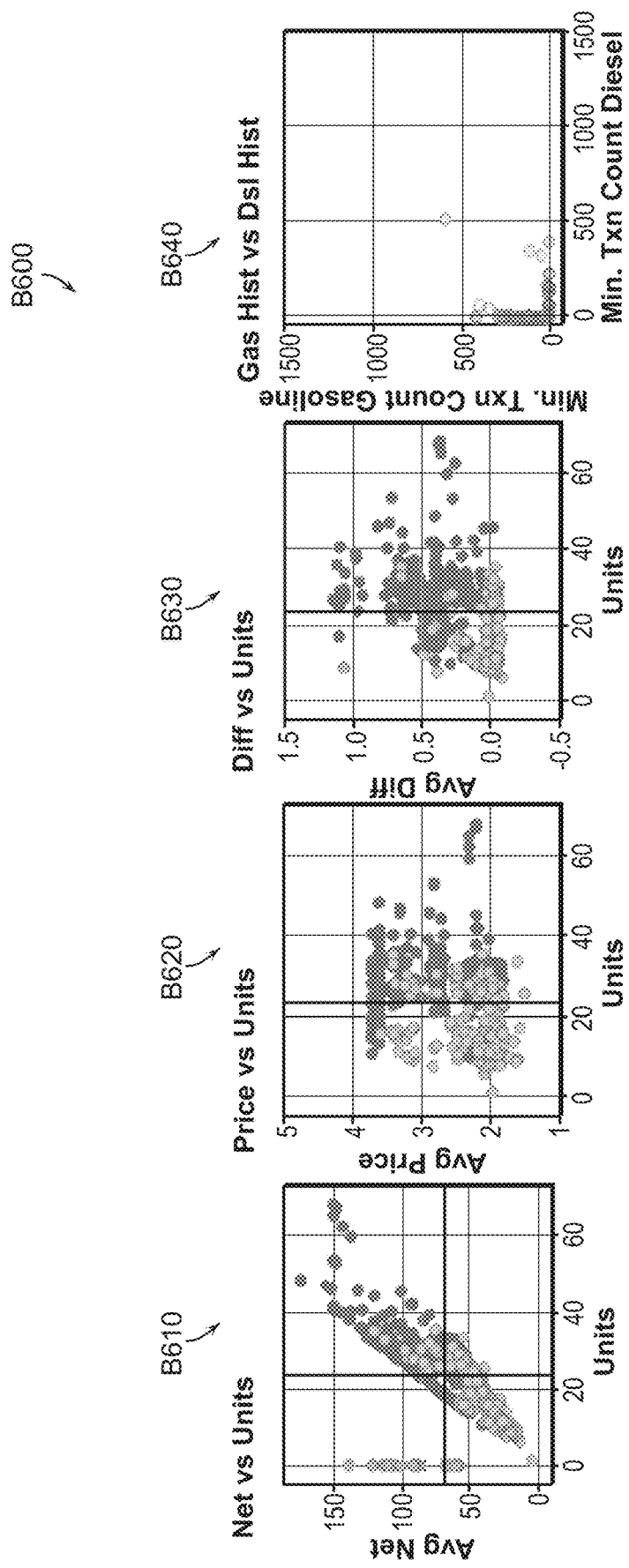
Figure 6C:
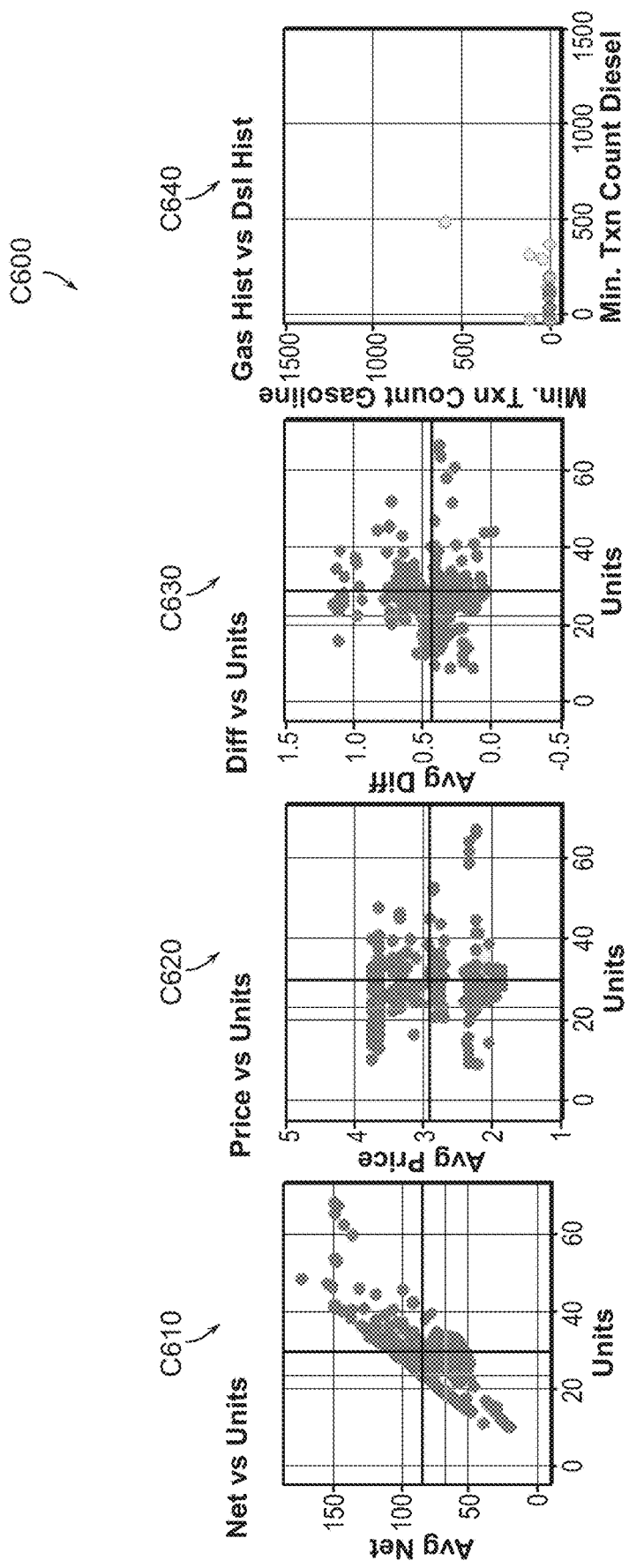
Figure 6D:
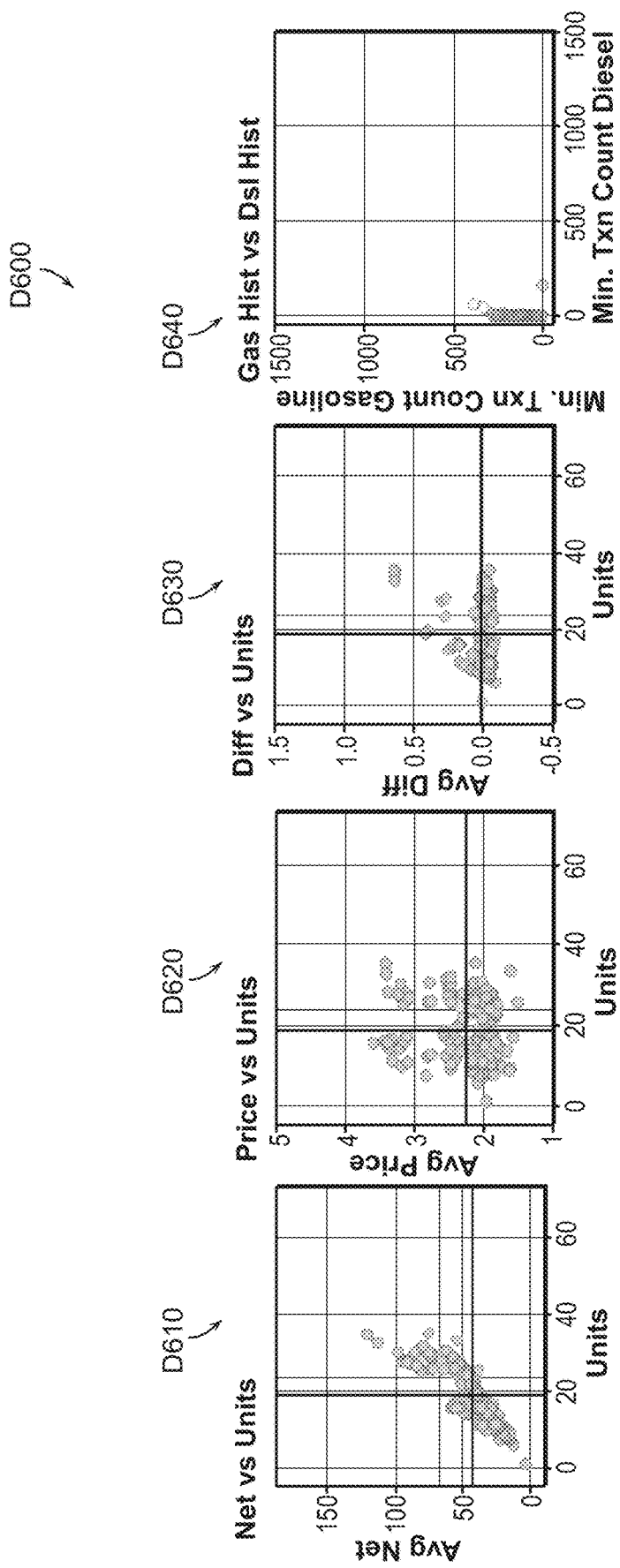

FIG. 6B shows frames B610, B620, B630, and B640 for the same dataset with corrected codes illustrated in grey scale. In particular darker dots correspond to purchases of fuel type-grade diesel-regular and lighter dots correspond to purchases of fuel type-grade gasoline-regular. These two different sets of purchases are shown separately in FIGS. 6C (diesel-regular) and 6D (gasoline-regular).

Figure 7:
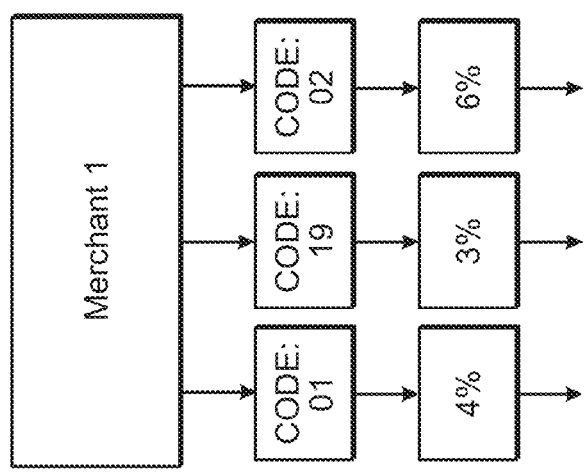
FIG. 7 is a block diagram illustrating the correction of miscodings in an embodiment.
Figure 7:
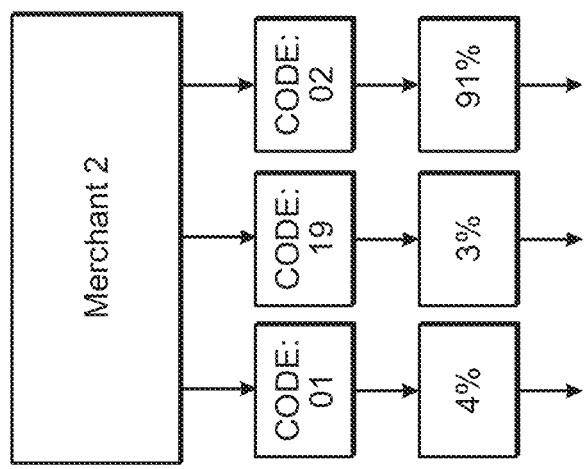
Figure 7:
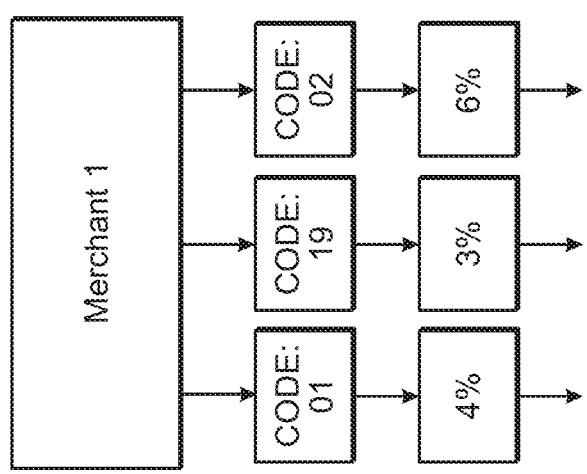

When the predicted codes differ from the transmitted codes, the system may identify them as miscodings and correct them only if the number of such discrepancies exceeds a minimum threshold number. FIG. 7 is a block diagram illustrating the identification and correction of miscodings in an embodiment. FIG. 7 illustrates three merchants, merchant 1, merchant 2, and merchant 3, who transmit to the system data for the transactions processed by each merchant. In particular, each merchant transmits, among others, three groups of transactions for which the fuel type-grade is coded with codes 01, 02, and 19. The variable-set for each transaction is processed by the machine learning module and flagged as correctly coded or miscoded. The flagging may include adding a miscoding flag to the variable-set for each transaction and setting its value to 1 or 0 if the transaction respectively is or is not miscoded. For each code and each merchant, a rate of miscoding is calculated as the ratio of miscoded transactions with that code to the total number of transaction with that code. FIG. 7 shows that, in this example, the rate of miscoding for codes 01, 02, and 19 are for merchant 1 respectively 4%, 6%, and 3%; for merchant 2 respectively 4%, 91%, and 3%; and for merchant 3 respectively 4%, 6%, and 3%.

The system may correct the miscodings if the miscoding rate exceeds a miscoding threshold rate. The miscoding threshold rate may be 10%, 50%, 80%, 90%, etc. In FIG. 7, the rate of miscoding for merchant 2 and code 02 (91%) exceeds the miscoding threshold rate, set to 80%. The system thus corrects the code in this group of transactions and stores the transactions with the corrected code.

Figure 8:
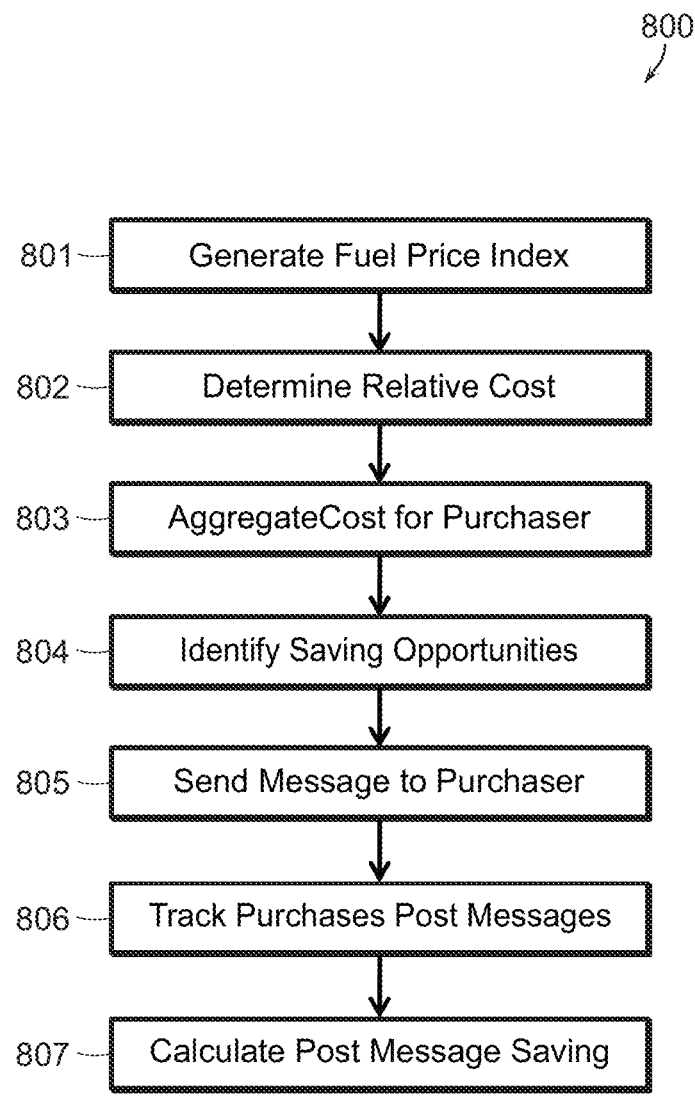
FIG. 8 shows a flowchart for a method of identifying and implementing savings opportunities at purchaser level according to some embodiments.

The correct fuel category may assist a transaction processing center in identifying and implementing savings opportunities. FIG. 8 shows a flowchart 800 for a method of identifying and implementing savings opportunities at purchaser level according to some embodiments. In flowchart 800, the system tracks purchase pattern of each purchaser (e.g., vehicle driver), identifies purchasers that can reduce the cost of their purchases, alerts them of the opportunity to reduce cost, and further tracks the reduction in the cost of their purchases after the alert In step 801, the system calculates a fuel price index for each transaction. As explained above, the fuel price index may be an average unit price of the fuel of the lowest grade of the same type as the fuel in the transaction, in a region that includes the location of the transaction and in a time window that includes the time of the transaction. The fuel price index enables comparing the fuel price in a transaction, and, equivalently, the fuel price at the corresponding merchant, with the average market price of the same fuel type in a comparable market. The comparable market includes merchants that are accessible to the purchaser for the transaction, because that market is within the time frame and near the location of the transaction. The fuel price index allows the system to identify merchants that sell a fuel type at prices that are lower or above the average.

Figure 9:
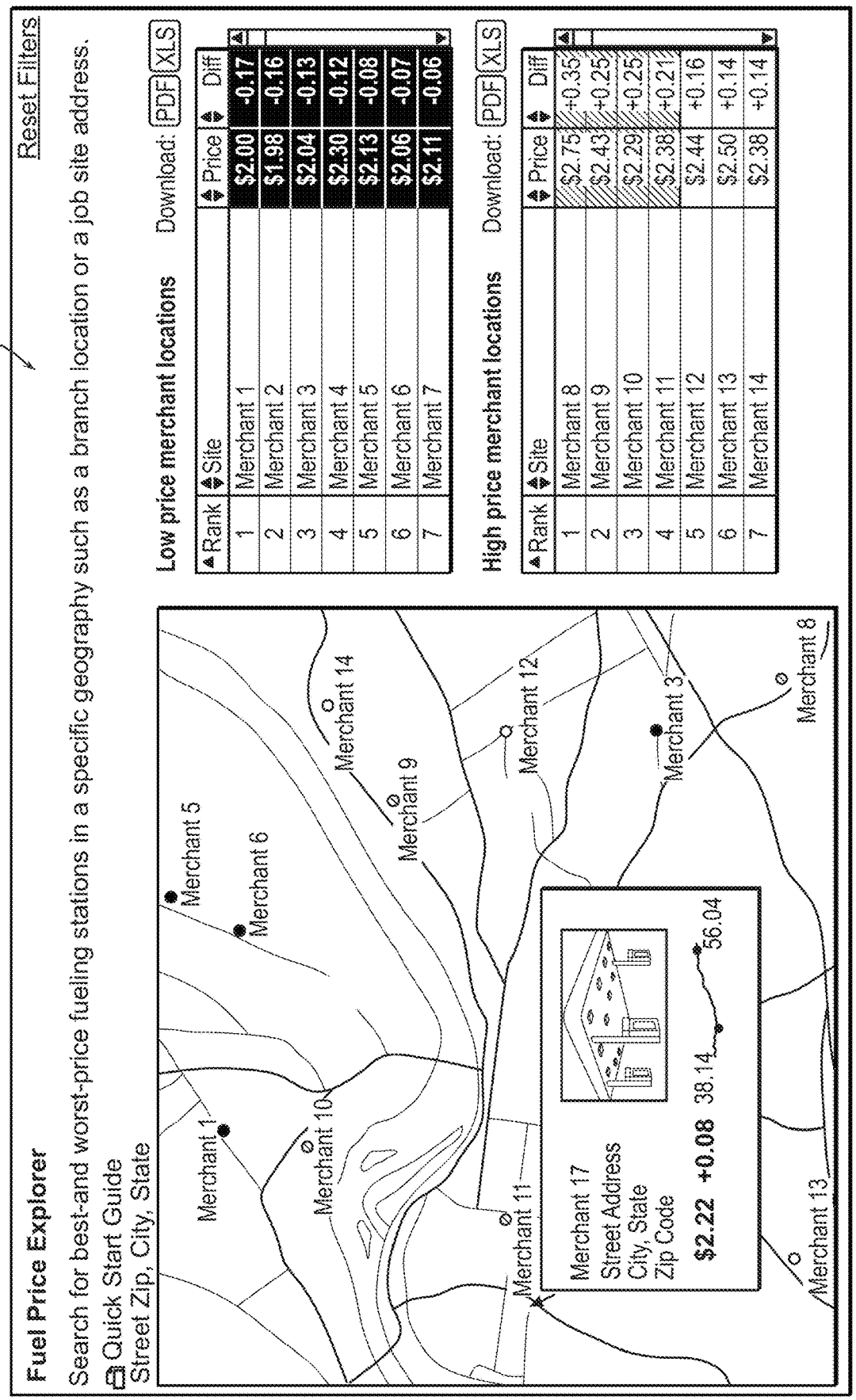
FIG. 9 shows a fuel price explorer view according to some embodiments.

The system may create the fuel price index from a fuel price explorer. A fuel price explorer may be a map of the fuel stations in a geographic region and the fuel price at each station. FIG. 9 shows a fuel price explorer view 900 according to some embodiments. The fuel price explorer view 900 enables a user to find, in a geographical region, fuel stations that offer fuel of specific type-grade and the unit price of the fuel at that station.

In step 802, the system calculates the relative cost for a purchase made by a purchaser. The relative cost may be the difference between the net sale in the transaction and the total cost if the fuel were purchased at the fuel price index for the fuel type as the purchased fuel. The system may identify the fuel type-grade from the fuel code in the transaction data or the corrected code after it is identified as miscoded.

To that end, the system identifies a geographic region that includes the location of the transaction. The system then finds the fuel price index for that region at or near the time of the transaction. The system then calculates the relative cost as the number of units in the purchase times the unit price difference. The unit price difference may be the unit price in the transaction minus the fuel price index. The relative cost may be positive, negative, or zero, indicating that the purchaser paid respectively more than, less than, or the same as the fuel price index.

In step 803, the system derives an aggregate cost for a purchaser for a period of time. To that end, the system adds the relative costs for the transactions made by the purchaser during the period of time. Moreover, the system may calculate an average relative cost per unit by dividing the aggregate cost by the total number of units of the fuel purchased in the transactions. The system may derive multiple aggregate costs and average relative cost per units for multiple purchasers.

In step 804, the system identifies a savings opportunity for a purchaser. A savings opportunity may correspond to a purchaser for whom the aggregate cost exceeds a threshold aggregate cost. In various embodiments, the threshold aggregate cost may be zero, or a positive amount such as $20, $100, etc.

Figure 10:
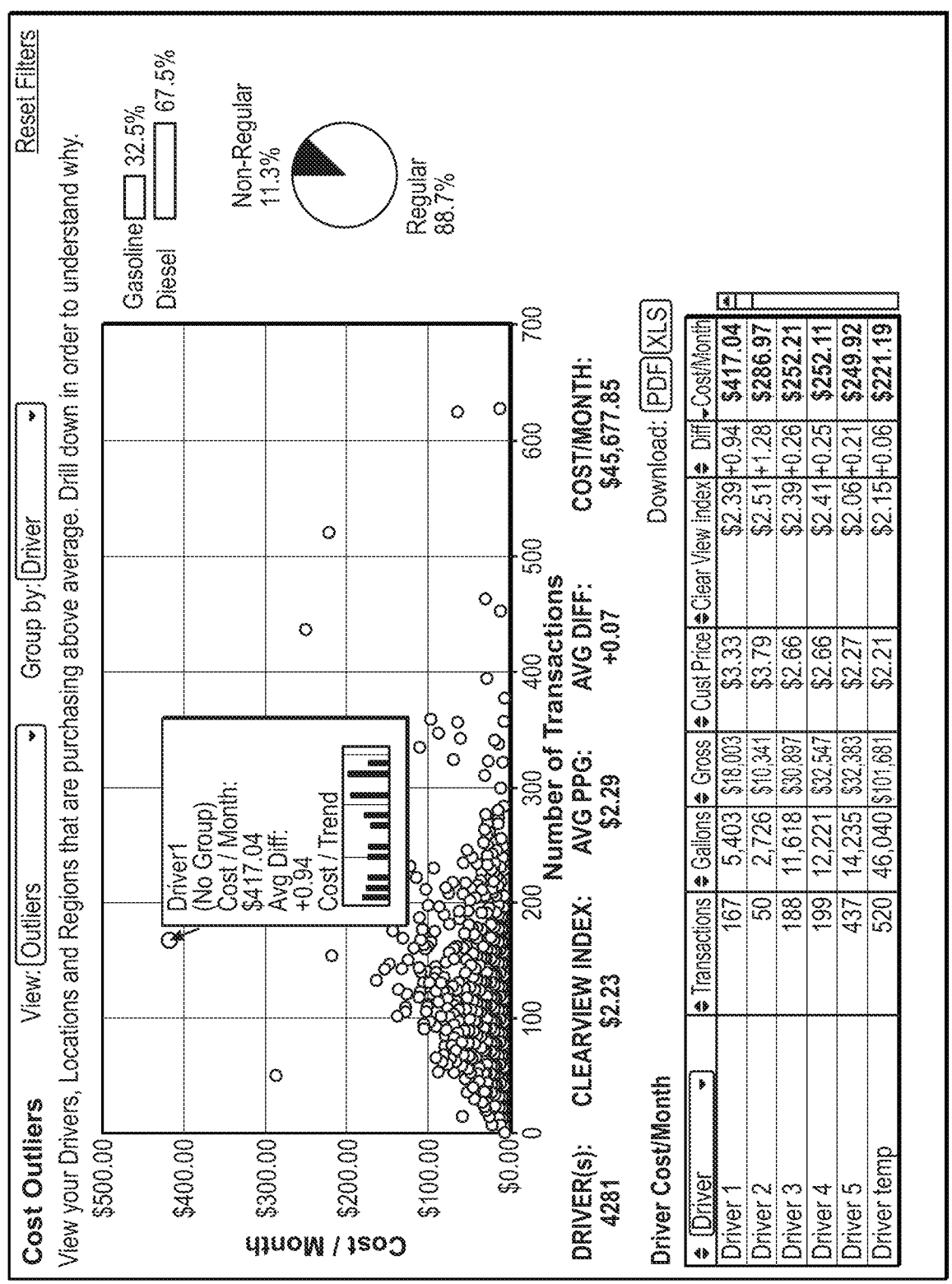
FIG. 10 shows a driver cost view according to some embodiments.

The system may identify a savings opportunity from a driver cost view. FIG. 10 shows a driver cost view 1000 according to some embodiments. In view 1000, each dot represents a purchaser, e.g., a driver. The Y coordinate represents the average aggregate cost per month for the driver and the X coordinate represents the number of transactions per month. The averages per month are found by finding the values for a period of time and then dividing them to the length of the period measured in months. View 1000 may also provide other information such as average relative cost per unit, number of units (e.g., gallons) per month, average unit price difference, etc. A user may receive this information in a table or as a pop-up upon clicking or hovering over a dot.

A user may identify one or more cost outliers. A cost outlier may be a driver for whom the cost per month is higher than a minimum cost per month threshold. Such an outlier may also be identified from view 1000 as a driver with a high Y value. The user may flag such an outlier as a driver with a savings opportunity. In some embodiments, such a driver with a small X value (small number of transactions) is identified as a saving opportunity with a higher priority as compared to such a driver with a large X value (large number of transactions).

In step 805, the system sends one or more messages to a purchaser for whom a savings opportunity was identified. The message may inform the driver that he or she is buying fuel at higher than optimal prices and recommend buying fuel of lower grades or at locations with lower prices in the future. The message may include information such as the aggregate cost, the fuel price index in the regions that the purchaser purchases fuel, location of one or more merchants that sell the fuel at a lower price, etc.

In step 806, the system further collects the transaction information for the purchaser for a post message period, that is, a period of time after sending the one or more messages to the purchaser.

In step 807, the system calculates a post message savings resulting from sending the one or more messages. To that end, the system calculates an average savings per unit by calculating an average relative cost per unit for the purchaser during the post message period, and subtracts from it the average relative cost per unit calculated for the same purchaser before the one or more messages were sent. The system then multiplies the average savings per unit by the total number of units purchased during the post message period to drive the post message savings.

Figure 11:
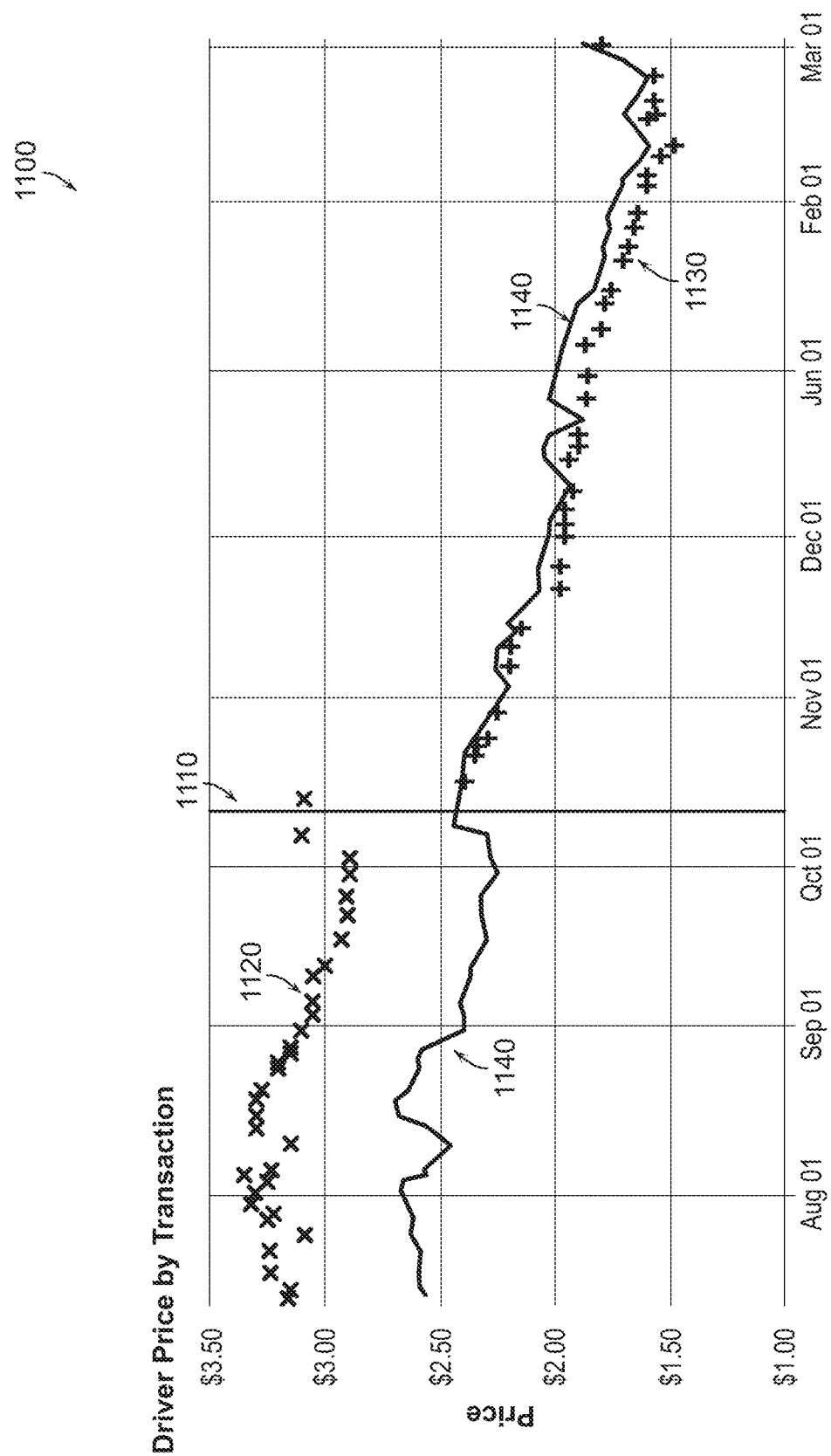
FIG. 11 shows a graph view of changes in transaction price for a purchaser to whom a message is sent, according to an embodiment.

The system may further track a purchaser's purchasing behavior and the effect of the message. FIG. 11 shows a graph view 1100 of changes in transaction price for a purchaser to whom a message is sent, according to an embodiment. In graph view 1100, the Y axis represents the price per unit and the X axis represents the time. Vertical line 1110 marks a time at which a message is sent to a purchaser for whom a savings opportunity was identified. In graph view 1100, data-points 1120 (crosses) show the price per unit for a fuel purchased by the purchaser at the corresponding time before receiving the message. Data-points 1130 (dots), on the other hand, show the price per unit for a fuel purchased by the purchaser at the corresponding time after receiving the message. Further, in graph view 1100, graph line 1140 shows the fuel price index for the transaction at each time.

Graph view 1100 shows that, for this purchaser, the unit purchase price (data-points 1120) was always higher than the average unit price (graph 1140) before receiving the message. This indicates that, before receiving the message, the driver purchased higher grade and thus more expensive fuel. But, after receiving the message, the unit purchase price (data-points 1130) fell to the average unit price (graph 1140). This change indicates that the purchaser improved its purchase behavior, resulting in a positive post message savings.

Each of the systems described above may comprise one or more modules. The modules may be implemented individually or their functions may be combined with the functions of other modules. Further, each of the modules may be implemented on individual components, or the modules may be implemented as a combination of components. For example, each of the modules may be implemented by a field-programmable gate array (FPGA), an application-specific integrated circuit (ASIC), a complex programmable logic device (CPLD), a printed circuit board (PCB), a combination of program able logic components and programmable interconnects, single CPU chip, a CPU chip combined on a motherboard, a general purpose computer, or any other combination of devices or modules capable of performing the tasks of the corresponding module.

In some embodiments, one or more of the disclosed methods are computer implemented methods or stored in the form of programs on one or more non-transitory computer readable mediums. A computer readable medium can be a data storage module. A data storage module may comprise a random access memory (RAM), a read only memory (ROM), a programmable read-only memory (PROM), a field programmable read-only memory (FPROM), or other dynamic storage device for storing information and instructions to be used by another module, such as a data processing module or a search module. A data storage module may also include a database, one or more computer files in a directory structure, or any other appropriate data storage mechanism such as a memory.

While several exemplary embodiments and features are described here, modifications, adaptations, and other implementations may be possible, without departing from the spirit and scope of the embodiments. Accordingly, unless explicitly stated otherwise, the descriptions relate to one or more embodiments and should not be construed to limit the embodiments as a whole. This is true regardless of whether or not the disclosure states that a feature is related to "a," "the," "one," "one or more," "some," or "various" embodiments. Instead, the proper scope of the embodiments is defined by the appended claims. Further, stating that a feature may exist indicates that the feature exists in one or more embodiments.

In this disclosure, the terms "include," "comprise," "contain," and "have," when used after a set or a system, mean an open inclusion and do not exclude addition of other, non-enumerated, members to the set or to the system. Further, unless stated otherwise or deducted otherwise from the context, the conjunction "or," if used, is not exclusive, but is instead inclusive to mean and/or. Moreover, if these terms are used, a subset of a set may include one or more than one, including all, members of the set.

The foregoing description of the embodiments has been presented for purposes of illustration only. It is not exhaustive and does not limit the embodiments to the precise form disclosed. Those skilled in the art will appreciate from the foregoing description that modifications and variations are possible in light of the above teachings or may be acquired from practicing the embodiments. For example, the described steps need not be performed in the same sequence discussed or with the same degree of separation. Likewise various steps may be omitted, repeated, combined, or performed in parallel, as necessary, to achieve the same or similar objectives. Similarly, the systems described need not necessarily include all parts described in the embodiments, and may also include other parts not described in the embodiments. Accordingly, the embodiments are not limited to the above-described details, but instead are defined by the appended claims in light of their full scope of equivalents.

What is claimed is:

1. A method, comprising:
using a training data set to train at least one machine learning module to classify respective input variable vectors into one of a plurality of categories corresponding to different characteristics of dispensed fuel, wherein the plurality of categories includes at least a first category corresponding to a first fuel characteristic and a second category corresponding to a second fuel characteristic, and wherein the training data set represents a plurality of variable vectors, with each variable vector of the plurality of variable vectors including values for at least a particular set of features of a respective fuel purchase transaction and having a corresponding label indicative of one of the plurality of categories;
using a testing data set to determine an accuracy indication for the at least one machine learning module;
determining that the accuracy indication satisfies a threshold;
deploying the at least one machine learning module based at least in part on the accuracy indication satisfying the threshold;
after deploying the at least one machine learning module, receiving, by a first computing system and from a second computing system of a fuel merchant, first data corresponding to a first fuel purchase transaction during which a quantity of fuel was dispensed from a fuel terminal, the first data representing at least a portion of a first variable vector including values for the particular set of features of the first fuel purchase transaction and including a first code indicating that the quantity of fuel had the first fuel characteristic;
using, by the first computing system, the at least one machine learning module to determine a category classification for the first variable vector;
determining that the at least one machine learning module classified the first variable vector into the second category corresponding to the second fuel characteristic rather than the first category corresponding to the first fuel characteristic;
determining, by the first computing system and based at least in part on the first variable vector having been classified into the second category rather than the first category, that first code was inaccurate and that the quantity of fuel had the second fuel characteristic rather than the first fuel characteristic;
storing, by the first computing system and based at least in part the quantity of fuel having been determined to have the second fuel characteristic rather than the first fuel characteristic, transaction data for the first fuel purchase transaction that includes a second code rather than the first code, the second code indicating that the quantity of fuel had the second fuel characteristic;
generating, by the first computing system, information based at least in part on the second code included in the transaction data; and
causing, by the first computing system, at least one computing device to display a representation of the information.

2. The method of claim 1, wherein:
the first fuel characteristic comprises at least one of a first fuel type or a first fuel grade; and
the second fuel characteristic comprises at least one of a second fuel type or a second fuel grade.

3. The method of claim 2, wherein the values included in the first variable vector comprise at least a first value corresponding to a sale amount for the first fuel purchase transaction and a second value corresponding to a number of units of fuel dispensed from the fuel terminal.

4. The method of claim 3, wherein the values included in the first variable vector further comprise a third value corresponding to a fuel consumption history for a vehicle that received the quantity of fuel.

5. The method of claim 4, wherein the values included in the first variable vector further comprise a fourth value corresponding to a diff value for the first fuel purchase transaction, the diff value representing a difference between a unit price of the quantity of fuel and a fuel price index.

6. The method of claim 3, wherein the values included in the first variable vector further comprise a third value corresponding to a diff value for the first fuel purchase transaction, the diff value representing a difference between a unit price of the quantity of fuel and a fuel price index.

7. The method of claim 1, wherein determining that the first code was inaccurate and that the quantity of fuel had the second fuel characteristic rather than the first fuel characteristic further comprises:
determining that the second category corresponds to the second code; and
determining that the second code is different than the first code.

8. The method of claim 1, wherein the at least one machine learning module comprises at least a first machine learning module and a second machine learning module, the values included in the first variable vector comprise at least a first subset of values and a second subset of values, and the method further comprises:
determining a fuel type of the quantity of fuel at least in part by using the first machine learning module to categorize the first subset of the values into one of a plurality of categories of fuel types, wherein the first subset includes at least a first value corresponding to a fuel type consumption history for a vehicle that received the fuel, a second value corresponding to a sale amount for the first fuel purchase transaction, and a third value corresponding to a number of units of fuel dispensed from the fuel terminal;
identifying a fuel price index based at least in part on the fuel type of the quantity of fuel;
determining a diff value as a difference between the fuel price index and a unit price of the quantity of fuel; and
determining a fuel grade at least in part by using the second machine learning module to categorize the second subset of values into one of a plurality of fuel grade categories, wherein the second subset includes at the second value corresponding to the sale amount for the first fuel purchase transaction, the third value corresponding to the number of units of fuel dispensed from the fuel terminal, and a fourth value corresponding to the diff value.

9. The method of claim 8, wherein the second subset further comprises a fifth value corresponding to a fuel grade consumption history for the vehicle that received the quantity of fuel.

10. The method of claim 1, further comprising:
identifying a fuel price index corresponding to a time and a location of the first fuel purchase transaction;
determining a difference between the fuel price index and a unit price of the quantity of fuel; and
based at least in part on the difference, sending a message regarding the quantity of fuel to a purchaser associated with the first fuel purchase transaction.

11. A first computing system, comprising:
at least one processor; and
at least one computer-readable medium encoded with instructions which, when executed by the at least one processor, cause the first computing system to:
use a training data set to train at least one machine learning module to classify respective input variable vectors into one of a plurality of categories corresponding to different characteristics of fuel, wherein the plurality of categories includes at least a first category corresponding to a first fuel characteristic and a second category corresponding to a second fuel characteristic, and wherein the training data set represents a plurality of variable vectors, with each variable vector of the plurality of variable vectors including values for at least a particular set of features of a respective fuel purchase transaction and having a corresponding label indicative of one of the plurality of categories;
use a testing data set to determine an accuracy indication for the at least one machine learning module;
determine that the accuracy indication satisfies a threshold;
deploy the at least one machine learning module based at least in part on the accuracy indication satisfying the threshold;
after deploying the at least one machine learning module, receive, from a second computing system of a fuel merchant, first data corresponding to a first fuel purchase transaction during which a quantity of fuel was dispensed from a fuel terminal, the first data representing at least a portion of a first variable vector including values for the particular set of features of the first fuel purchase transaction and including a first code indicating that the quantity of fuel had the first fuel characteristic;
use the at least one machine learning module to determine a category classification for the first variable vector;
determine that the at least one machine learning module classified the first variable vector into the second category corresponding to the second fuel characteristic rather than the first category corresponding to the first fuel characteristic;
determine, based at least in part on the first variable vector having been classified into the second category rather than the first category, that first code was inaccurate and that the quantity of fuel had the second fuel characteristic rather than the first fuel characteristic;
store, based at least in part a the quantity of fuel having been determined to have the second fuel characteristic rather than the first fuel characteristic, transaction data for the first fuel purchase transaction that includes a second code rather than the first code, the second code indicating that the quantity of fuel had the second fuel characteristic;
generate information based at least in part on the second code included in the transaction data; and
cause at least one computing device to display a representation of the information.

12. The first computing system of claim 11, wherein:
the first fuel characteristic comprises at least one of a first fuel type or a first fuel grade; and
the second fuel characteristic comprises at least one of a second fuel type or a second fuel grade.

13. The first computing system of claim 12, wherein the values included in the first variable vector comprise at least a first value corresponding to a sale amount for the first fuel purchase transaction and a second value corresponding to a number of units of fuel dispensed from the fuel terminal.

14. The first computing system of claim 13, wherein the values included in the first variable vector further comprise a third value corresponding to a fuel consumption history for a vehicle that received the quantity of fuel.

15. The first computing system of claim 14, wherein the values included in the first variable vector further comprise a fourth value corresponding to a diff value for the first fuel purchase transaction, the diff value representing a difference between a unit price of the quantity of fuel and a fuel price index.

16. The first computing system of claim 13, wherein the values included in the first variable vector further comprise a third value corresponding to a representation of a diff value for the first fuel purchase transaction, the diff value representing a difference between a unit price of the quantity of fuel and a fuel price index.

17. The first computing system of claim 11, wherein the at least one computer-readable medium is further encoded with additional instructions which, when executed by the at least one processor, further cause the first computing system to determine that the first code was inaccurate and that the quantity of fuel had the second fuel characteristic rather than the first fuel characteristic at least in part by:
determining that the second category corresponds to the second code; and
determining that the second code is different than the first code.

18. The first computing system of claim 11, wherein the at least one machine learning module comprises at least a first machine learning module and a second machine learning module, the values included in the first variable vector comprise at least a first subset of values and a second subset of values, and the at least one computer-readable medium is further encoded with additional instructions which, when executed by the at least one processor, further cause the first computing system to:
determine a fuel type of the quantity of fuel at least in part by using the first machine learning module to categorize the first subset of the values into one of a plurality of categories of fuel types, wherein the first subset includes at least a first value corresponding to a fuel type consumption history for a vehicle that received the fuel, a second value corresponding to a sale amount for the first fuel purchase transaction, and a third value corresponding to a number of units of fuel dispensed from the fuel terminal;
identify a fuel price index based at least in part on the fuel type of the quantity of fuel;
determine a diff value as a difference between the fuel price index and a unit price of the quantity of fuel; and
determine a fuel grade at least in part by using the second machine learning module to categorize the second subset of values into one of a plurality of fuel grade categories, wherein the second subset includes at the second value corresponding to the sale amount for the first fuel purchase transaction, the third value corresponding to the number of units of fuel dispensed from the fuel terminal, and a fourth value corresponding to the diff value.

19. The first computing system of claim 18, wherein the second subset further comprises a fifth value corresponding to a fuel grade consumption history for the vehicle that received the quantity of fuel.

20. The first computing system of claim 11, wherein the at least one computer-readable medium is further encoded with additional instructions which, when executed by the at least one processor, further cause the first computing system to:
  identify a fuel price index corresponding to a time and a location of the first fuel purchase transaction;
  determine a difference between the fuel price index and a unit price of the quantity of fuel; and
  based at least in part on the difference, send a message regarding the quantity of fuel to a purchaser associated with the first fuel purchase transaction.

* * * * *